United States Patent [19]

Nohara et al.

[11] Patent Number: 6,008,304

[45] Date of Patent: Dec. 28, 1999

[54] ADDITIVE FOR MASTICATING NATURAL RUBBER, MASTICATION METHOD OF NATURAL RUBBER, NATURAL RUBBER COMPOSITION OBTAINED BY THE MASTICATION METHOD THEREOF, AND PNEUMATIC TIRE USING THE NATURAL RUBBER COMPOSITION THEREOF

[75] Inventors: Daisuke Nohara, Kodaira; Masaaki Tsuchihashi; Isao Nishi, both of Wakayama, all of Japan

[73] Assignees: Bridgestone Corporation; KAO Corporation, both of Tokyo, Japan

[21] Appl. No.: 09/046,606

[22] Filed: Mar. 24, 1998

[30] Foreign Application Priority Data

Mar. 25, 1997 [JP] Japan .................................. 9-072045
Jan. 30, 1998 [JP] Japan .................................. 10-019116

[51] Int. Cl.$^6$ ...................................................... C08K 5/08
[52] U.S. Cl. ....................... 525/332.5; 524/287; 524/288; 524/289; 524/290; 524/291; 524/292; 524/293; 524/294; 524/295; 524/296; 524/297; 524/298; 524/299; 524/300
[58] Field of Search .................................. 524/284, 287, 524/288, 289, 290, 291, 292, 293, 294, 295, 296, 297, 298, 299, 300

[56] References Cited

U.S. PATENT DOCUMENTS

| | | | |
|---|---|---|---|
| 2,570,632 | 10/1951 | Barton | 260/31.8 |
| 3,297,607 | 1/1967 | Behrens | 260/23.7 |
| 3,915,943 | 10/1975 | Wright | 260/85.1 |
| 4,075,159 | 2/1978 | Koyama et al. | 260/42.47 |
| 4,191,671 | 3/1980 | Katoaka et al. | 260/23.7 M |
| 4,410,656 | 10/1983 | Coran et al. | 524/529 |

FOREIGN PATENT DOCUMENTS

| | | |
|---|---|---|
| 0494131A1 | 7/1992 | European Pat. Off. . |
| 0551818A1 | 7/1993 | European Pat. Off. . |
| 0603611A1 | 6/1994 | European Pat. Off. . |
| 150473 | 9/1981 | Germany . |

OTHER PUBLICATIONS

"Chemical Dictionary", Grant and Hackhs (1987).

*Primary Examiner*—Edward J. Cain
*Attorney, Agent, or Firm*—Sughrue, Mion, Zinn Macpeak & Seas, PLLC

[57] ABSTRACT

An additive for masticating natural rubber comprising at least one compound selected from the group consisting of benzoic acids, naphthoic acids, dicarboxylic acids and compounds represented by Formula (IV):

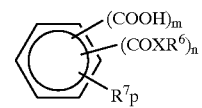

(IV)

wherein m and n each represent an integer of 1 to 3; p represents an integer of 1 to 4; m+n+p=6; X is O, $NR^8$ or $(R^9O)_q$; $R^6$ is a $C_1$~$C_{24}$ alkyl, a $C_2$~$C_{24}$ alkenyl, or a $C_6$~$C_{24}$ aryl group; and $R^7$ is H, OH, an alkyl, alkenyl or aryl group; $R^8$ is H or a $C_1$~$C_{24}$ alkyl group; $R^9$ is a $C_1$~$C_4$ alkyl group; q is an integer of 1 to 5, a mastication method and a natural rubber composition each of which uses the additive, and a pneumatic tire using the natural rubber composition.

28 Claims, No Drawings

ADDITIVE FOR MASTICATING NATURAL RUBBER, MASTICATION METHOD OF NATURAL RUBBER, NATURAL RUBBER COMPOSITION OBTAINED BY THE MASTICATION METHOD THEREOF, AND PNEUMATIC TIRE USING THE NATURAL RUBBER COMPOSITION THEREOF

BACKGROUND OF THE INVENTION

1. Field of the Invention

The present invention relates to an additive for masticating natural rubber capable of reducing the amount of gel without lowering the molecular weight and capable of improving the processability as well, a mastication method of natural rubber using the above additive, a natural rubber composition obtained by the above mastication method, and a pneumatic tire using the above natural rubber composition.

2. Description of the Related Art

In rubber products such as tires, belts and hoses, blended are various compounding agents such as vulcanizing agents and reinforcing agents. In order to facilitate this blending work and molding work of the rubber products, a mastication step for crude rubber (natural rubber) which Is a raw material is essential.

In general, the significance of mastication lies in providing crude rubber with satisfactory plasticity by giving shearing force to it. This mastication facilitates blending and milling work (work for milling homogeneously various compounding agents into crude rubber) like dispersing of various compounding agents such as vulcanizing agents and fillers. Further, the mastication stabilizes the dimensions, makes the skin fine and makes scorching difficult in after-steps of rolling and extruding, that is, it serves the purpose for making it easy to carry out these operations.

In this mastication, the molecular weight is also reduced by breaking the molecules of crude rubber to have the rubber plasticized by mere mechanical mastication using a roll machine, an internal mixer and the like. However, such mechanical mastication requires electricity, labor and time in very large quantities.

Accordingly, it is generally known well that a peptizer is used in a mastication step of crude rubber.

Thiophenols having substituents on an aromatic ring and disulfides have so far been used as a peptizer.

However, there are such problems that the use of these peptizers allows the plasticization to go on to reduce the viscosity of the rubber and that at the same time, the molecular chains of the rubber are broken and vulcanized rubber obtained by vulcanizing the rubber becomes inferior in breaking characteristics.

On the other hand, in natural rubber there exist gels formed by intertwined molecular chains and by the reaction between functional groups contained in the isoprene chains of the natural rubber or the reaction of such functional groups with non-rubber components contained in the natural rubber. This gel component causes an increase in viscosity of crude rubber (storage hardening) or poor dispersion of the rubber compounding agents.

Ordinary mastication reduces this gel component but breaks the molecular chains at the same time. Accordingly, the same problems as described above take place.

Thus, so far there have been no techniques for selectively reducing the amount of gel without lowering the molecular weight of natural rubber.

SUMMARY OF THE INVENTION

An object of the present invention is to provide an additive for masticating natural rubber capable of reducing the amount of gel natural rubber without lowering the molecular weight thereof and capable of improving the processability as well, a mastication method of natural rubber using the above additive, a natural rubber composition obtained by the above mastication method, and a pneumatic tire using the above natural rubber composition.

Intensive investigations made by the present inventors in order to solve the conventional problems described above have resulted in finding that a specific compound has such effects that the amount gel of natural rubber can be reduced without lowering the molecular weight thereof and the processability can be improved as well. Further researches have resulted in successfully obtaining an intended additive for masticating natural rubber, a mastication method of natural rubber using the above additive, a natural rubber composition obtained by the above mastication method, and a pneumatic tire using the above natural rubber composition, and thus coming to complete the present invention.

That is, the present invention comprises the following constitutions (1) to (8):

(1) An additive for masticating natural rubber comprising at least one compound selected from the group consisting of benzoic acids represented by the following Formula (I), naphthoic acids represented by the following Formula (II), dicarboxylic acids represented by the following Formula (III) and aromatic polycarboxylic acid derivatives represented by the following Formula (IV):

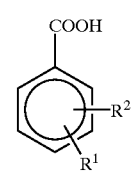

(I)

wherein $R_1$ and $R_2$ each represent —H, —CH$_3$, —CH$_2$CH$_3$, —C(CH$_3$)$_3$, —NH$_2$, —OH, —SH, —NO$_2$, —COPh, —Br, —Cl, —CH$_2$CH$_2$CH$_3$, —CH(CH$_3$)$_2$, —OCH$_3$ or —OC$_2$H$_5$ and may be same or different,

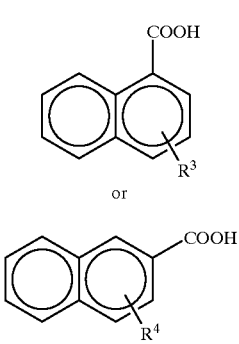

(II)

wherein $R_3$ and $R_4$ each represent —H, —OH or —NH$_2$,

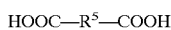

(III)

wherein $R_5$ represents

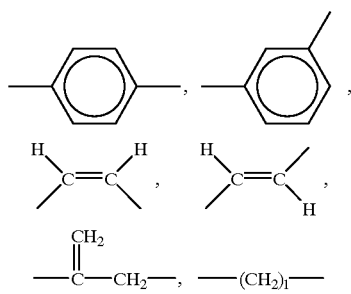

(l is an integer of 1 to 14),

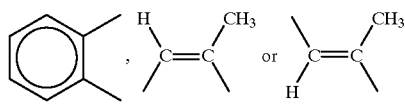

and

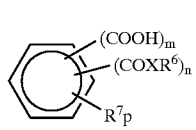

wherein m and n each represent an integer of 1 to 3; p represents an integer of 1 to 4; m+n+p=6; when m≧2, a part or all of the carboxyl groups may be dehydrated to an anhydride in a molecule; X is any one of O, $NR^8$ ($R^8$ is H or an alkyl group having 1 to 24 carbon atoms) and $(R^9O)_q$ ($R^9$ is an alkyl group having 1 to 4 carbon atoms, and q is an integer of 1 to 5); $R^6$ is any one of an alkyl group having 1 to 24 carbon atoms, an alkenyl group having 2 to 24 carbon atoms and an aryl group having 6 to 24 carbon atoms; $R^7$ is any one of H, OH, an alkyl group, an alkenyl group and an aryl group; and a part or all of hydrogens in both $R^6$ and $R^7$ may be substituted with halogens.

(2) The additive for natural rubber as described in the above item (1), wherein the benzoic acids represented by Formula (I) described above are p-toluic acid and p-t-butylbenzoic acid.

(3) The additive for natural rubber as described in the above item (1), wherein the dicarboxylic acids represented by Formula (III) described above are terephthalic acid, isophthalic acid, fumaric acid and adipic acid.

(4) The additive for natural rubber as described in the above item (1), wherein the aromatic polycarboxylic acid derivatives represented by Formula (IV) described above are derivatives of any one of phthalic acid, trimellitic acid, pyromellitic acid or an anhydride thereof.

(5) A mastication method of natural rubber comprising a step of carrying out mastication after adding 0.05 to 20 parts by weight of at least one selected from the additives for natural rubber as described in any one of the above items (1) to (4) relative to 100 parts by weight of the natural rubber.

(6) The mastication method of natural rubber as described in above (5), wherein a peptizer is used in combination with the additive for natural rubber.

(7) A natural rubber composition obtained by the mastication method of natural rubber as described in the above item (5) or (6).

(8) A pneumatic tire characterized by using the natural rubber composition as described in the above item (7).

According to the present invention, there is provided an additive for masticating natural rubber capable of reducing the amount gel of natural rubber without lowering the molecular weight thereof and capable of improving the processability as well. The use of this additive provides a natural rubber composition in which the rubber compounding agents are not brought about poor dispersion and vulcanized rubber obtained by vulcanizing the rubber composition does not lose its quality in breaking properties. A pneumatic tire obtained by using the above rubber composition is excellent in heat-generating properties and abrasion resistance.

DETAILED DESCRIPTION OF THE PREFERRED EMBODIMENTS

The embodiments of the present invention are explained in detail below.

The additive for masticating natural rubber of the present invention comprises at least one compound selected from the group consisting of the benzoic acids represented by Formula (I) described above, the naphthoic acids represented by Formula (II) described above, the dicarboxylic acids represented by Formula (III) described above and the aromatic polycarboxylic acid derivatives represented by Formula (IV) described above.

The additive for natural rubber of the present invention can reduce the amount of gel of the natural rubber without lowering the molecular weight thereof by adding at a mastication step of natural rubber.

In particular, the processability can be improved as well by using the aromatic polycarboxylic acid derivatives represented by Formula (IV) described above.

Examples of the benzoic acids represented by Formula (I) described above include benzoic acid, p-toluic acid, p-t-butylbenzoic acid, anthranilic acid, p-aminobenzoic acid, p-nitrobenzoic acid, o-benzoylbenzoic acid, salicylic acid and thiosalicylic acid.

Among them, p-toluic acid and p-t-butylbenzoic acid are preferable in terms of the great effects of the present invention, a low cost and no sublimating property.

Examples of the naphthoic acids represented by Formula (II) described above include a -naphthoic acid, β-naphthoic acid and β-oxynaphthoic acid.

Examples of the dicarboxylic acids represented by Formula (III) described above include terephthalic acid, isophthalic acid, fumaric acid, adipic acid, maleic acid, citraconic acid, sebacic acid and dodecanoic diacid.

Further, among them, terephthalic acid, isophthalic acid, fumaric acid and adipic acid are preferable in terms of the great effects of the present invention and a low cost.

Preferable among as the aromatic polycarboxylic acid derivatives represented by Formula (IV) described above are, for example, derivatives of any one of phthalic acid, trimellitic acid, pyromellitic acid or an anhydride thereof.

In the aromatic polycarboxylic acid derivatives represented by Formula (IV) described above, $R^6$ is preferably an alkyl group having 1 to 22 carbon atoms, and X is preferably O or $(R^9O)_q$. In particular, X is preferably O.

Further, the aromatic polycarboxylic acid derivatives represented by Formula (IV) described above are preferably derivatives of any one of phthalic acid, trimellitic acid, pyromellitic acid and an anhydride thereof in which $R^6$ in Formula (IV) described above is an alkyl group having 1 to 22 carbon atoms and X is O or $(R^9O)_q$. In particular, preferable are such derivatives which have O for X.

To be specific, they include monostearyl phthalate, monodecyl phthalate, N-octyl phthalamic acid, monodecyl trimellitate, monostearyl trimellitate, monostearyl pyromellitate and distearyl pyromellitate.

Among them, monoalkyl phthalates are preferable in terms of an effect of reducing the amount of gel, a plasticizing effect and a low cost, and monostearyl phthalate is more preferable.

The mastication method of natural rubber of the present invention is characterized in that the amount of gel of the natural rubber can be reduced without lowering the molecular weight thereof by masticating 100 parts by weight of natural rubber blended with 0.05 to 20 parts by weight of at least one compound selected from the benzoic acids represented by Formula (I) described above, the naphthoic acids represented by Formula (II) described above, the dicarboxylic acids represented by Formula (III) described above and the aromatic polycarboxylic acid derivatives represented by Formula (IV) described above.

The blending amount of the additives represented by Formulas (I) to (IV) described above has been set to 0.05 to 20 parts by weight per 100 parts by weight of the natural rubber component because the blending amount of less than 0.05 part by weight can not provide the desired effects of the present invention. On the other hand, the blending amount exceeding 20 parts by weight exerts an adverse effect on the breaking characteristics of the vulcanized rubber to bring about undesired effects.

The blending amount of the additives represented by Formulas (I) to (IV) varies within the range described above depending on the kind of natural rubber such as RSS (Ribbed Smoked sheets) and TSR (Technical Standard Rubber) and the grade, and is preferably within the range from 1 to 5 parts by weight from the viewpoints of a cost, an effect met with an increased amount and handling.

In the mastication method of the present invention, the additives described above may be used alone or in combination of two or more kinds thereof. The additives according to the present invention may be used in combination with thiophenols and disulfides which are usually used as peptizers by substituting for a part of the additives of the present invention. The blending amount of the peptizers has to be 10% by weight or less based on the blending amount of the additives of the present invention. If the blending amount exceeds 10% by weight, an adverse effect of breaking the molecular chains is increased, and the vulcanized rubber obtained by vulcanization is deteriorated in breaking properties. Accordingly, it is not preferable that the blending amount exceeds 10% by weight.

Further, in the mastication method of the present invention, with respect to a masticating machine used, mastication time, rubber temperature and the like, the optimum machine and ranges shall be selected according to uses of the rubber.

The masticating machine used includes, for example, a roll machine, an internal mixer and a Gordon plasticator. When, for example, the roll machine is used, a roll interval, a roll revolution ratio, a roll revolution number and the like are selected in the optimum ranges.

A start temperature of mastication, though varied depending on uses of the rubber, is 60 to 85° C., preferably 70 to 80° C. Mastication time is 60 to 120 seconds, preferably 80 to 100 seconds.

The mastication method of natural rubber thus constituted according to the present invention can reduce the amount of gel of natural rubber without lowering the molecular weight thereof and improve the processability as well (these points shall be explained in further detail in the examples described later).

Gels formed by intertwined molecular chains and the reaction between functional groups contained in the isoprene chains of natural rubber or the reaction of such functional groups with non-rubber components contained in the natural rubber are absent from the natural rubber composition obtained by the preceding mastication method of natural rubber. Thus, the amount of gel of the natural rubber can selectively be reduced without lowering the molecular weight thereof.

Accordingly, the use (plastic processing) of this natural rubber composition makes it easy to disperse various compounding agents such as a vulcanizing agent and a filler and facilitates exceedingly operations at a mixing step, that is, operations for milling homogeneously various compounding agents in non-productive mixing in which fillers such as carbon black, oils and an anti-oxidant are blended into crude rubber and milled and then in productive mixing in which sulfur and a vulcanization accelerator are blended and milled. Further, the use of the natural rubber composition stabilizes the dimensions, makes the skin fine and makes scorching difficult in rolling and extruding which are aftersteps, that is, makes it possible to carry out these operations very easily and efficiently and does not deteriorate the breaking characteristics of the vulcanized rubber obtained by vulcanization.

The resulting natural rubber composition can suitably be used for rubber products such as conveyor belts, belts and hoses in addition to pneumatic tires.

The pneumatic tire of the present invention is characterized by using the natural rubber composition obtained by the mastication method described above.

In general, a pneumatic tire has structure that comprises a tread part, a pair of side parts connected at both sides of said tread part and a pair of bead parts each of which is formed in the inner circumferences of said side parts and that is reinforced with a carcass ply formed by disposing carcass ply cords in a tire radial direction and a belt layer surrounding said carcass ply and buried in the inside of the tread part.

The pneumatic tire of the present invention uses the natural rubber composition obtained by the mastication method described above and is blended, if necessary, with a suitable amount of synthetic rubber depending on the tire component members forming the tire structure described above. That is, if the tire component members are, for example, tread rubber, belt coating rubber, carcass ply rubber, bead filler rubber, rubber chafer and side wall rubber, the natural rubber composition obtained by the mastication method described above is blended, if necessary, with a suitable amount of synthetic rubber according to uses of these tire rubber component members.

The synthetic rubber to be blended includes, for example, styrene-butadiene rubber (SBR), butadiene rubber (BR), isoprene rubber (IR), butyl rubber (IIR), halogenated butyl rubber (X-IIR), ethylene-propylene rubber (EPDM) and a mixture thereof but shall not be restricted thereto.

In the production of the pneumatic tire of the present invention, first a rubber component comprising the natural rubber composition obtained by the mastication method described above and synthetic rubber blended if necessary are blended with a filler such as carbon black, oils and an anti-oxidant depending on the preceding various tire component members to be applied to carry out non-productive mixing and then blended with sulfur and a vulcanization accelerator to carry out productive mixing.

Then, the resulting rubber composition is applied to the respective tire component members. These component members are molded into a green tire on a drum, and then the green tire is vulcanized by means of a vulcanizing machine, whereby an intended pneumatic tire is obtained.

In the production of the pneumatic tire of the present invention, with respect to a mixing machine, a vulcanizing machine, mixing time (non-productive mixing time and productive mixing time), mixing temperature (non-productive mixing temperature and productive mixing temperature), vulcanizing time and vulcanizing temperature, the optimum machines and ranges are selected depending on uses of the pneumatic tire.

The pneumatic tire of the present invention thus constituted is excellent in a heat-generating property and abrasion resistance since a reduction in the molecular weights of the natural rubber compositions used for the various tire component members described above is less than in conventional natural rubber compositions.

EXAMPLE

The present invention shall be explained below with reference to examples, but the present invention shall not be restricted thereby.

In the following examples and comparative examples, the amounts of gel, the molecular weights and the Mooney viscosities were determined by the following methods.

Measurement of Mooney Viscosity ($ML_{1+4}$, Processability) of Masticated Rubber The Mooney viscosity of the masticated rubber was measured for processability at 100° C. by means of a Mooney viscometer SMV201 manufactured by Shimadzu Corp., and the value obtained after 5 minutes was employed.

Examples 1 to 9 and Comparative Examples 1 to 4

Natural rubber was blended with the additives according to the recipes (parts by weight) shown in Table 1, and then was masticated by means of a banbury mixer under a masticating conditions of 90 seconds at 80° C. of a starting temperature.

The resulting masticated rubber was measured for an amount of gel and a molecular weight. These results are shown in the following Table 1. RSS No. 3 was used as natural rubber.

TABLE 1

|  | Comparative Example | | | | Example | | | | | | | | |
| --- | --- | --- | --- | --- | --- | --- | --- | --- | --- | --- | --- | --- | --- |
|  | 1 | 2 | 3 | 4 | 1 | 2 | 3 | 4 | 5 | 6 | 7 | 8 | 9 |
| Natural rubber | 100*1 | 100 | 100 | 100 | 100 | 100 | 100 | 100 | 100 | 100 | 100 | 100 | 100 |
| Additive of the invention | — | — | — | — | I-① | I-② | II-① | III-① | III-② | III-③ | I-① | I-② | III-③ |
| Blend amount (phr) | — | — | — | — | 1 | 1 | 1 | 1 | 1 | 1 | 1 | 1 | 0.5 |
| Peptizer | — | — | A | B | — | — | — | — | — | — | A | B | — |
| Blend amount (phr) |  |  | 0.88 | 0.88 |  |  |  |  |  |  | 0.02 | 0.02 |  |
| Amount of gel (%) | 25.0 | 21.0 | 10.0 | 10.5 | 8.5 | 8.9 | 9.5 | 10.2 | 9.8 | 8.0 | 7.2 | 7.3 | 9.5 |
| Molecular weight (Mw) (*10E6) | 1.80 | 1.60 | 1.10 | 1.12 | 1.62 | 1.58 | 1.64 | 1.59 | 1.65 | 1.62 | 1.50 | 1.50 | 1.60 |

Codes shown in the table mean the following:
*1: no mastication
I-①: p-toluic acid
I-②: p-t-butylbenzoic acid
II-①: α-naphthoic acid
III-①: terephthalic acid
III-②: isophthalic acid
III-③: adipic acid
A: o,o'-dibenzamide diphenyl disulfide (Noctizer SS: Ohuchi Shinko Chemical Co., Ltd.)
B: pentachlorothiophenol Measurement of the Amount of Gel of Masticated Rubber In order to measure the amount of gel of masticated rubber, 0.2 g of the rubber was immersed in 60 ml of toluene and left for standing at room temperature for 24 hours.

Then, the gel component was separated by means of a centrifugal separator, and the solvent was evaporated in a vacuum drier. Then, the weight of the gel was measured.

Measurement of Molecular Weight of Masticated Rubber

The molecular weight of masticated rubber was determined by means of GPC (gel permeation chromatography) manufactured by Tosoh Corp. after dissolving 0.03 g of the rubber in 30 ml of THF (tetrahydrofuran) and leaving for standing at room temperature for 24 hours.

Examples 10 to 17 and Comparative Examples 5 to 7

Natural rubber was blended with the additives according to the recipes (parts by weight) shown in Table 2, and then was masticated by means of the banbury mixer under a masticating condition of 90 seconds at 80° C. a starting temperature.

The resulting masticated rubber was measured for an amount of gel, a molecular weight and a Mooney viscosity. These results are shown in the following Table 2. RSS No. 3 was used as natural rubber.

TABLE 2

| | Comparative Example | | | | | Example | | | | | | | |
|---|---|---|---|---|---|---|---|---|---|---|---|---|---|
| | 1 | 2 | 5 | 6 | 7 | 10 | 11 | 12 | 13 | 14 | 15 | 16 | 17 |
| Natural rubber | 100 (no mastication) | 100 | 100 | 100 | 100 | 100 | 100 | 100 | 100 | 100 | 100 | 100 | 100 |
| Additive of the invention | None | None | None | None | IV-① | IV-① | IV-③ | IV-④ | IV-② | IV-⑤ | IV-⑥ | IV-⑦ | IV-① |
| Blend amount (phr) | 0 | 0 | 0 | 0 | 0.02 | 2 | 2 | 2 | 2 | 2 | 2 | 2 | 8 |
| Peptizer | None | None | A | B | None | None | None | None | None | None | None | None | None |
| Blend amount (phr) | 0 | 0 | 0.05 | 0.05 | 0 | 0 | 0 | 0 | 0 | 0 | 0 | 0 | 0 |
| Amount of gel (%) | 25.0 | 21.0 | 15.0 | 15.2 | 13.3 | 7.2 | 8.6 | 8.4 | 8.2 | 8.2 | 8.6 | 7.5 | 7.0 |
| Molecular weight (Mw) (*10E6) | 1.8 | 1.6 | 1.1 | 1.1 | 1.6 | 1.6 | 1.6 | 1.6 | 1.6 | 1.6 | 1.6 | 1.6 | 1.6 |
| Mooney viscosity (ML 1 + 4) | 110 | 97 | 80 | 81 | 78 | 68 | 73 | 71 | 71 | 72 | 70 | 70 | 65 |

IV-①: monostearyl phthalate
IV-②: monodecyl phthalate
IV-③: monodecyl trimellitate
IV-④: monostearyl trimellitate
IV-⑤: monostearyl pyromellitate
IV-⑥: distearyl pyromellitate
IV-⑦: N-octyl phthalamic acid
A: o,o'-dibenzamide diphenyl disulfide (Noctizer SS: Ohuchi Shinko Chemical Co., Ltd.)
B: pentachlorothiophenol Considerations on Table 1 and Table 2

It has been confirmed from the general point of view that in Examples 1 to 9 falling in the scope of the present invention, the amounts of gel can be reduced without lowering the molecular weights as compared with Comparative Examples 1 to 4 falling outside the scope of the present invention and that in Examples 10 to 17, the processabilities can be improved as well.

From the individual cases, it can be found that in Comparative Example 1 in which the natural rubber has not been masticated, the amount of gel is increased and in Comparative Example 2 in which the natural rubber has been masticated as usual, the amount of gel is also increased and the molecular weight is lowered as well. Further, it can be confirmed that in Comparative Examples 3 to 6 in which conventional peptizers have been added to masticate the natural rubber, the amounts of gel are reduced but the molecular weights are notably lowered as well. It can be found that in Comparative Example 7 in which less amount of an aromatic polycarboxylic acid derivative which is an additive according to the present invention is blended, the amount of gel grows large.

In contrast with this, it has been confirmed that in Examples 1 to 6 and Examples 9 to 17 in which the additives of the present invention have been used to masticate the natural rubber, the amounts of gel can markedly be reduced without lowering the molecular weights and further, the processabilities can be improved as well.

Further, it has been confirmed as well that in Examples 7 and 8 in which a peptizer has been substituted for a part of the additives of the present invention to masticate, the amounts of gel can be reduced without lowering the molecular weights so much.

Examples 18 to 25 and Examples 8 to 12

The rubber compositions obtained by using the natural rubber compositions obtained in Examples 10 to 17 and in Comparative Examples 1, 2 and 5 to 7 and mixing them according to the recipes (parts by weight) shown in the following Table 3 by means of a banbury mixer under the following conditions were used for tread parts to prepare pneumatic tires (size 11R 22-5):

Mixing Conditions non-productive mixing: start temperature 80° C., revolution number 50 RPM, time 4 minutes productive mixing: start temperature 80° C., revolution number 50 RPM, time 1 minute Vulcanizing conditions: 150° C., 25 minutes The respective pneumatic tires obtained in Examples 18 to 25 and Comparative Examples 8 to 12 were measured for a heat-generating property and abrasion resistance by the following methods. These results are shown in the following Table 3.

Measurement of Heat-Generating Property

A test tire was charged with air having a maximum air pressure prescribed in JATMA and subjected to a running test by means of a drum test machine at a speed of 65 km/hr with a load of 150% of the maximum load applied to determine the maximum temperature in the inside of the tread. A reciprocal number of the temperature was calculated to show a heat-generating property by index, wherein that of Comparative Example was set at 100 (control). The larger the value is, the better the heat-generating property is.

Measurement of Abrasion Resistance

A commercial car equipped with test tires was driven 5000 km on roads, and then the traveling distance per abrasion by 1 mm was calculated from the remaining grooves.

The value of Comparative Example 10 was set at 100 (control), and the larger the value is, the more excellent the tire is in abrasion resistance.

TABLE 3

| | Comparative Example | | | | |
|---|---|---|---|---|---|
| | 8 | 9 | 10 | 11 | 12 |
| Rubber component: (part by weight) | | | | | |
| Natural rubber composition (Comparative Example No.) | 100 No. 1 | 100 No. 2 | 100 No. 5 | 100 No. 6 | 100 No. 7 |
| Carbon black (HAF) | 50 | 50 | 50 | 50 | 50 |

TABLE 3-continued

|  | | | | | |
|---|---|---|---|---|---|
| Stearic acid | 2 | 2 | 2 | 2 | 2 |
| Zinc oxide | 2 | 2 | 2 | 2 | 2 |
| Anti-oxidant*1 | 4 | 4 | 4 | 4 | 4 |
| Vulcanization accelerator*2 | 1.5 | 1.5 | 1.5 | 1.5 | 1.5 |
| Sulfur | 1.5 | 1.5 | 1.5 | 1.5 | 1.5 |
| Heat-generating property | 105 | 103 | 100 | 100 | 103 |
| Abrasion resistance | 107 | 102 | 100 | 99 | 104 |

| | Example | | | |
|---|---|---|---|---|
| | 18 | 19 | 20 | 21 |
| Rubber component (part by weight) | | | | |
| Natural rubber composition (Example No.) | 100 No. 10 | 100 No. 11 | 100 No. 12 | 100 No. 13 |
| Carbon black (HAF) | 50 | 50 | 50 | 50 |
| Stearic acid | 2 | 2 | 2 | 2 |
| Zinc oxide | 2 | 2 | 2 | 2 |
| Anti-oxidant*1 | 4 | 4 | 4 | 4 |
| Vulcanization accelerator*2 | 1.5 | 1.5 | 1.5 | 1.5 |
| Sulfur | 1.5 | 1.5 | 1.5 | 1.5 |
| Heat-generating property | 110 | 106 | 107 | 108 |
| Abrasion resistance | 115 | 108 | 109 | 110 |

| | Example | | | |
|---|---|---|---|---|
| | 22 | 23 | 24 | 25 |
| Rubber component (part by weight) | | | | |
| Natural rubber composition (Example No.) | 100 No. 14 | 100 No. 15 | 100 No. 16 | 100 No. 17 |
| Carbon black (HAF) | 50 | 50 | 50 | 50 |
| Stearic acid | 2 | 2 | 2 | 2 |
| Zinc oxide | 2 | 2 | 2 | 2 |
| Anti-oxidant*1 | 4 | 4 | 4 | 4 |
| Vulcanization accelerator*2 | 1.5 | 1.5 | 1.5 | 1.5 |
| Sulfur | 1.5 | 1.5 | 1.5 | 1.5 |
| Heat-generating property | 108 | 106 | 108 | 110 |
| Abrasion resistance | 110 | 108 | 113 | 116 |

*1: Nocrac 6C (Ohuchi Shinko Chemical Co., Ltd.): N-phenyl-N'-(1,3-dimethylbutyl)-p-phenylenediamine
*2: Nocceler NS-P (Ohuchi Shinko Chemical Co., Ltd.): N-tert-butyl-2-benzothiazolylsulfonamide

What is claimed is:

1. A method of masticating natural rubber comprising:
adding to natural rubber 0.05 to 20 parts by weight of an additive relative to 100 parts by weight of the natural rubber, and
carrying out mastication;
wherein the additive comprises at least one compound selected from the group consisting of benzoic acids represented by the following Formula (I), naphthoic acids represented by following Formula (II), dicarboxylic acids represented by the following Formula (III) and aromatic polycarboxylic acid derivatives represented by the following Formula (IV):

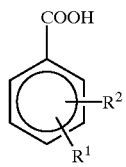
(I)

wherein $R_1$ and $R_2$ each represent —H, —CH$_3$, —CH$_2$CH$_3$, —C(CH$_3$)$_3$, —NH$_2$, —OH, —SH, —NO$_2$, —COPh, —Br, —Cl, —CH$_2$CH$_2$CH$_3$, —CH(CH$_3$)$_2$, —OCH$_3$ or —OC$_2$H$_5$ and may be same or different,

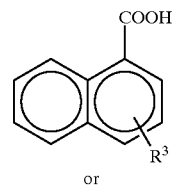
(II)

wherein $R_3$ and $R_4$ each represent —H, —OH, or —NH$_2$,

HOOC—R$^5$—COOH   (III)

wherein $R_5$ represents

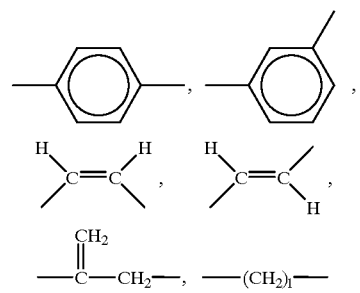

(l is an integer of 1 to 14)

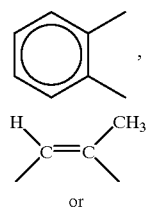
(IV)

wherein m and n each represent an integer of 1 to 3; p represents an integer of 1 to 4; m+n+p=6; when m≧2, a part or all of the carboxyl groups may be dehydrated to an anhydride in a molecule; X is selected from the group consisting of O, NR$^8$ (R$^8$ is H or an alkyl group having 1 to 24 carbon atoms) and (R$^9$O)$_q$ (R$^9$ is an alkyl group having 1 to 4 carbon atoms, and q is an integer of 1 to 5); R$^6$ is selected from the group consisting of an alkyl group having 1 to 24 carbon atoms, an alkenyl group having 2 to 24 carbon atoms and an aryl group having 6 to 24 carbon atoms; R$^7$ is selected from the group consisting of H, OH, an alkyl group, an alkenyl group and an aryl group; and any or all of the hydrogen atoms in either $R^6$ and $R^7$ may be replaced with halogen atoms.

2. The method of masticating natural rubber as described in claim 1, wherein said method comprises adding a peptizer to the natural rubber in combination with the additive.

3. The method of masticating natural rubber of claim 1, wherein said benzoic acids represented by Formula (I) are selected from the group consisting of p-toluic acid and p-t-butylbenzoic acid.

4. The method of masticating natural rubber of claim 1, wherein said dicarboxylic acids represented by Formula (III) are selected from the group consisting of terephthalic acid, isophthalic acid, fumaric acid and adipic acid.

5. The method of masticating natural rubber of claim 1, wherein said aromatic polycarboxylic acid represented by Formula (IV) are selected from the group consisting of derivatives of phthalic acid, trimellitic acid, pyromellitic acid and anhydrides thereof.

6. A method of masticating natural rubber comprising:

adding to natural rubber 0.05 to 20 parts by weight of an additive relative to 100 parts by weight of the natural rubber, and carrying out mastication;

wherein said additive is selected from the group consisting of aromatic polycarboxylic acid derivatives represented Formula (IV):

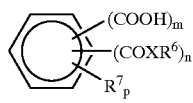

(IV)

wherein m and n each represent an integer of 1 to 3; p represents an integer of 1 to 4; m+n+p=6; when m≧2, a part or all of the carboxyl groups may be dehydrated to an anhydride in a molecule; X is selected from the group consisting of O, $NR^8$, wherein $R^8$ is H or an alkyl group having to 24 carbon atoms, and $(R^9O)_q$, wherein $R^9$ is an alkyl group having 1 to 4 carbon atoms and q is an integer of 1 to 5; $R^6$ is selected from the group consisting of an alkyl group having 1 to 24 carbon atoms, an alkenyl group having 2 to 24 carbon atoms and an aryl group having 6 to 24 carbon atoms; $R^7$ is selected from the group consisting of H, OH, an alkyl group, an alkenyl group and an aryl group; and any or all of the hydrogen atoms in either $R^6$ and $R^7$ may be replaced with halogen atoms.

7. The method of masticating natural rubber of claim 1, wherein said additive reduces gelation.

8. A natural rubber composition obtained by a mastication method comprising:

adding to natural rubber 0.05 to 20 parts by weight of an additive relative to 100 parts by weight of the natural rubber, and carrying out mastication;

wherein the additive comprises at least one compound selected from the group consisting of benzoic acids represented by the following Formula (I), naphthoic acids represented by the following Formula (II), dicarboxylic acids represented by the following Formula (III) and aromatic polycarboxylic acid derivatives represented by the following Formula (IV):

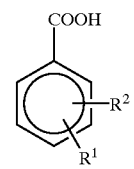

(I)

wherein $R_1$ and $R_2$ each represent —H, —$CH_3$, —$CH_2CH_3$, —$C(CH_3)_3$, —$NH_2$, —Oh, —SH, —$NO_2$, —COPh, —Br, —Cl, —$CH_2CH_2CH_3$, —$CH(CH_3)_2$, —$OCH_3$ or —$OC_2H_5$ and may be same or different,

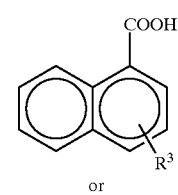

or

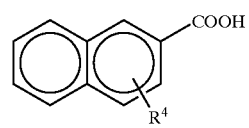

wherein $R_3$ and $R_4$ each represent —H, OH or —$NH_2$,

HOOC—$R^5$—COOH (III)

wherein $R_5$ represents

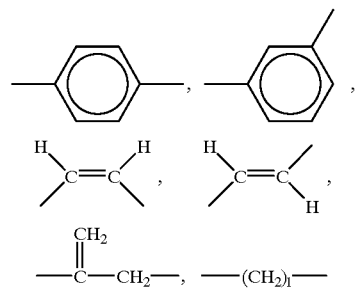

(l is an integer of 1 to 14)

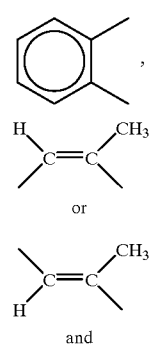

(IV)

and

-continued

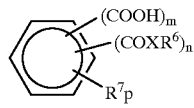

wherein m and n each represent an integer of 1 to 3; p represents an integer of 1 to 4; m+n+p=6; when m≧2, a part or all of the carboxyl groups may be dehydrated to an anhydride in a molecule; X is selected from the group consisting of O, $NR^8$ ($R^8$ is H or an alkyl group having 1 to 24 carbon atoms) and $(R^9O)_q$ ($R^9$ is an alkyl group having 1 to 4 carbon atoms, and q is an integer of 1 to 5); $R^6$ is selected from the group consisting of an alkyl group having 1 to 24 carbon atoms, an alkenyl group having 2 to 24 carbon atoms and an aryl group having 6 to 24 carbon atoms; $R^7$ is selected from the group consisting of H, OH, an alkyl group, an alkenyl group and an aryl group; and any or all of the hydrogen atoms in either $R^6$ and $R^7$ maybe replaced with halogen atoms.

9. The natural rubber composition of claim 8, wherein said benzoic acids represented by Formula (I) are selected from the group consisting of p-toluic acid and p-t-butylbenzoic acid.

10. The natural rubber composition of claim 8, wherein said dicarboxylic acids represented by Formula (III) are selected from the group consisting of terephthalic acid, isophthalic acid, fumaric acid and adipic acid.

11. The natural rubber composition of claim 8, wherein said aromatic polycarboxylic acid represented by Formula (IV) are selected from the group consisting of derivatives of phthalic acid, trimellitic acid, pyromellitic acid and anhydrides thereof.

12. The natural rubber composition of claim 8, wherein said mastication method further comprises adding a peptizer to the natural rubber in combination with the additive.

13. A natural rubber composition obtained by a mastication method comprising:
adding to natural rubber 0.5 to 20 parts by weight of an additive relative to 100 parts by weight of the natural rubber, and
carrying out mastication;
wherein said additive is selected from the group consisting of aromatic polycarboxylic acid derivatives represented Formula (IV):

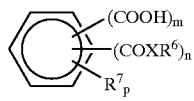

(IV)

wherein m and n each represent an integer of 1 to 3; p represents an integer of 1 to 4; m+n+p=6; when m≧2, a part or all of the carboxyl groups may be dehydrated to an anhydride in a molecule; X is selected from the group consisting of O, $NR^8$, wherein $R^8$ is H or an alkyl group having 1 to 24 carbon atoms, and $(R^9O)_q$, wherein $R^9$ is an alkyl group having 1 to 4 carbon atoms and q is an integer of 1 to 5; $R^6$ is selected from the group consisting of an alkyl group having 1 to 24 carbon atoms, an alkenyl group having 2 to 24 carbon atoms and an aryl group having 6 to 24 carbon atoms; $R^7$ is selected from the group consisting of H, OH, an alkyl group, an alkenyl group and an aryl group; and any or all of the hydrogen atoms in either $R^6$ and $R^7$ may be replaced with halogen atoms.

14. A pneumatic tire including a vulcanized a natural rubber composition prepared by a method of masticating natural rubber comprising:

adding to natural rubber 0.05 to 20 parts by weight of an additive relative to 100 parts by weight of the natural rubber, and carrying out mastication;

wherein the additive comprises at least one compound selected from the group consisting of benzoic acids represented by the following Formula (I), naphthoic acids represented by the following Formula (II), dicarboxylic acids represented by the following Formula (III) and aromatic polycarboxylic acid derivatives represented by the following Formula (IV):

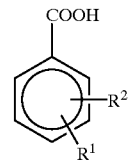

(I)

wherein $R_1$ and $R_2$ each represent —H, —$CH_3$, —$CH_2CH_3$, —$C(CH_3)_3$, —$NH_2$, —OH, —SH, $NO_2$, —COPh, —Br, —Cl, —$CH_2CH_2CH_3$, —$CH(CH_3)_2$, —$OCH_3$ or —$OC_2H_5$ and may be same or different,

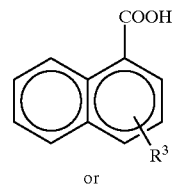

or

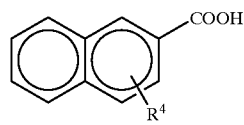

(II)

wherein $R_3$ and $R_4$ each represent —H, —OH or —$NH_2$,

HOOC—$R^5$—COOH (III)

wherein $R_5$ represents

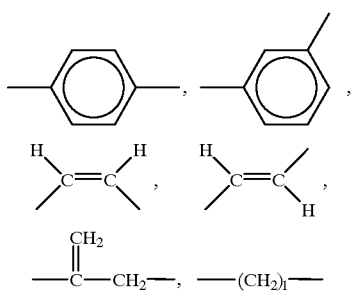

(l is an integer of 1 to 14)

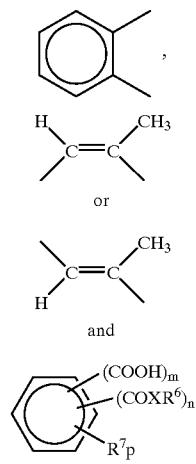

wherein m and n each represent an integer of 1 to 3; p represents an integer of 1 to 4; m+n+p=6; when m≧2, a part or all of the carboxyl groups may be dehydrated to an anhydride in a molecule: X is selected from the group consisting of O, $NR^8$ ($R^8$ is H or an alkyl group having 1 to 24 carbon atoms) and $(R^9O)_q$ ($R^9$ is an alkyl group having 1 to 4 carbon atoms, and q is an integer of 1 to 5); $R^6$ is selected from the group consisting of an alkyl group having 1 to 24 carbon atoms, an alkenyl group having 2 to 24 carbon atoms and an aryl group having 6 to 24 carbon atoms; $R^7$ is selected from the group consisting of H, OH, an alkyl group, an alkenyl group and an aryl group; and any or all of the hydrogen atoms in either $R^6$ and $R^7$ may be replaced with halogen atoms.

15. The pneumatic tire of claim 14, wherein said benzoic acids represented by Formula (I) are selected from the group consisting of p-toluic acid and p-t-butylbenzoic acid.

16. The pneumatic tire of claim 14, wherein said dicarboxylic acids represented by Formula (III) are selected from the group consisting of terephthalic acid, isophthalic acid, fumaric acid and adipic acid.

17. The pneumatic tire of claim 14, wherein said aromatic polycarboxylic acid represented by Formula (IV) are selected from the group consisting of derivatives of phthalic acid, trimellitic acid, pyromellitic acid and anhydrides thereof.

18. The pneumatic tire of claim 14, wherein said method of masticating further comprises adding a peptizer to the natural rubber in combination with the additive.

19. A pneumatic tire including a vulcanized natural rubber composition prepared by a method of masticating natural rubber comprising:
adding to natural rubber 0.05 to 20 parts by weight of an additive relative to 100 parts by weight of the natural rubber, and
carrying out mastication;

wherein said additive is selected from the group consisting of aromatic polycarboxylic acid derivatives represented Formula (IV):

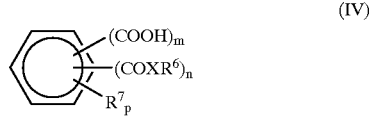

wherein m and n each represent an integer of 1 to 3; p represents an integer of 1 to 4; m+n+p=6; when m≧2, a part or all of the carboxyl groups may be dehydrated to an anhydride in a molecule; X is selected from the group consisting of O, $NR^8$, wherein $R^8$ is H or an alkyl group having 1 to 24 carbon atoms, and $(R^9O)_q$, wherein $R^9$ is an alkyl group having 1 to 4 carbon atoms and q is an integer of 1 to 5; $R^6$ is selected from the group consisting of an alkyl group having 1 to 24 carbon atoms, an alkenyl group having 2 to 24 carbon atoms and an aryl group having 6 to 24 carbon atoms; $R^7$ is selected from the group consisting of H, OH, an alkyl group, an alkenyl group and an aryl group; and any or all of the hydrogen atoms in either $R^6$ and $R^7$ may be replaced with halogen atoms.

20. The method of masticating natural rubber as described in claim 3, wherein said method comprises adding a peptizer to the natural rubber in combination with the additive.

21. The method of masticating natural rubber as described in claim 4, wherein said method comprises adding a peptizer to the natural rubber in combination with the additive.

22. The method of masticating natural rubber as described in claim 5, wherein said method comprises adding a peptizer to the natural rubber in combination with the additive.

23. The natural rubber composition of claim 9, wherein said mastication method further comprises adding a peptizer to the natural rubber in combination with the additive.

24. The natural rubber composition of claim 10, wherein said mastication method further comprises adding a peptizer to the natural rubber in combination with the additive.

25. The natural rubber composition of claim 11, wherein said mastication method further comprises adding a peptizer to the natural rubber in combination with the additive.

26. The pneumatic tire of claim 15, wherein said method of masticating further comprises adding a peptizer to the natural rubber in combination with the additive.

27. The pneumatic tire of claim 16, wherein said method of masticating further comprises adding a peptizer to the natural rubber in combination with the additive.

28. The pneumatic tire of claim 17, wherein said method of masticating further comprises adding a peptizer to the natural rubber in combination with the additive.

* * * * *